(12) United States Patent
Downer et al.

(10) Patent No.: US 8,811,038 B2
(45) Date of Patent: Aug. 19, 2014

(54) APPARATUS AND METHOD FOR SOFT SWITCHING IN A MEDIUM VOLTAGE TO LOW VOLTAGE CONVERTER

(75) Inventors: Scott Downer, Torrance, CA (US); Naimish Patel, Boston, MA (US)

(73) Assignee: Gridco, Inc., Cambridge, MA (US)

( * ) Notice: Subject to any disclaimer, the term of this patent is extended or adjusted under 35 U.S.C. 154(b) by 0 days.

(21) Appl. No.: 13/294,858

(22) Filed: Nov. 11, 2011

(65) Prior Publication Data
US 2013/0121030 A1 May 16, 2013

(51) Int. Cl.
*H02M 3/335* (2006.01)
*H02M 3/28* (2006.01)

(52) U.S. Cl.
CPC .............. *H02M 3/28* (2013.01); *Y02B 70/1491* (2013.01)
USPC .......................................................... 363/16

(58) Field of Classification Search
USPC ............... 363/15–17, 123–125, 64, 131, 361, 363/95–98, 132; 323/361
See application file for complete search history.

(56) References Cited

U.S. PATENT DOCUMENTS

| | | |
|---|---|---|
| 4,864,479 A | 9/1989 | Steigerwald et al. |
| 5,132,889 A * | 7/1992 | Hitchcock et al. ............. 363/17 |
| 5,245,520 A | 9/1993 | Imbertson |
| 5,245,645 A | 9/1993 | Steinberg |
| 5,418,704 A * | 5/1995 | Hua et al. ..................... 323/282 |
| 5,539,630 A * | 7/1996 | Pietkiewicz et al. ........... 363/17 |
| 5,621,634 A | 4/1997 | Sato |
| 5,956,238 A * | 9/1999 | Wunderlich .................... 363/17 |
| 5,982,645 A | 11/1999 | Levran et al. |
| 5,986,907 A | 11/1999 | Limpaecher |
| 6,005,788 A | 12/1999 | Lipo et al. |
| 6,067,237 A | 5/2000 | Nguyen |
| 6,072,856 A | 6/2000 | Van Der Broeck et al. |
| 6,075,350 A | 6/2000 | Peng |
| 6,344,985 B1 | 2/2002 | Akerson |
| 6,577,108 B2 | 6/2003 | Hubert et al. |
| 6,972,972 B2 | 12/2005 | Duncan et al. |
| 7,092,265 B2 | 8/2006 | Kernahan |
| 7,095,220 B2 | 8/2006 | Kernahan |
| 7,219,673 B2 | 5/2007 | Lemak |
| 7,230,837 B1 | 6/2007 | Huang et al. |
| 7,379,309 B2 | 5/2008 | Isurin et al. |
| 7,535,738 B2 | 5/2009 | Wei et al. |
| RE41,170 E | 3/2010 | Hubert et al. |
| 7,679,941 B2 | 3/2010 | Raju et al. |
| 7,733,183 B2 | 6/2010 | Komijani et al. |
| 7,760,025 B2 | 7/2010 | Kee et al. |
| 7,768,800 B2 | 8/2010 | Mazumder et al. |
| 7,778,045 B2 | 8/2010 | Alexander |
| 7,786,622 B2 * | 8/2010 | Swan ........................... 307/104 |
| 7,787,270 B2 | 8/2010 | NadimpalliRaju et al. |
| 7,830,681 B2 | 11/2010 | Abolhassani et al. |
| 8,218,345 B2 * | 7/2012 | Callanan et al. ................ 363/89 |
| 2008/0278971 A1 * | 11/2008 | Polikarpov .................. 363/21.03 |

* cited by examiner

*Primary Examiner* — Timothy J Dole
*Assistant Examiner* — Ivan Laboy Andino
(74) *Attorney, Agent, or Firm* — Iandiorio Teska & Coleman, LLP

(57) ABSTRACT

A switching and control arrangement are provided along with a transformer arrangement such that semiconductor-based switches can be used in a medium DC voltage to AC inverter in a medium voltage to low voltage DC to DC converter. The switching arrangement on the secondary side of the transformer arrangement controls a current ramp up or down of switches on the primary side of the transformer that are used to convert DC to AC, thereby permitting for soft switching of those switches.

4 Claims, 6 Drawing Sheets

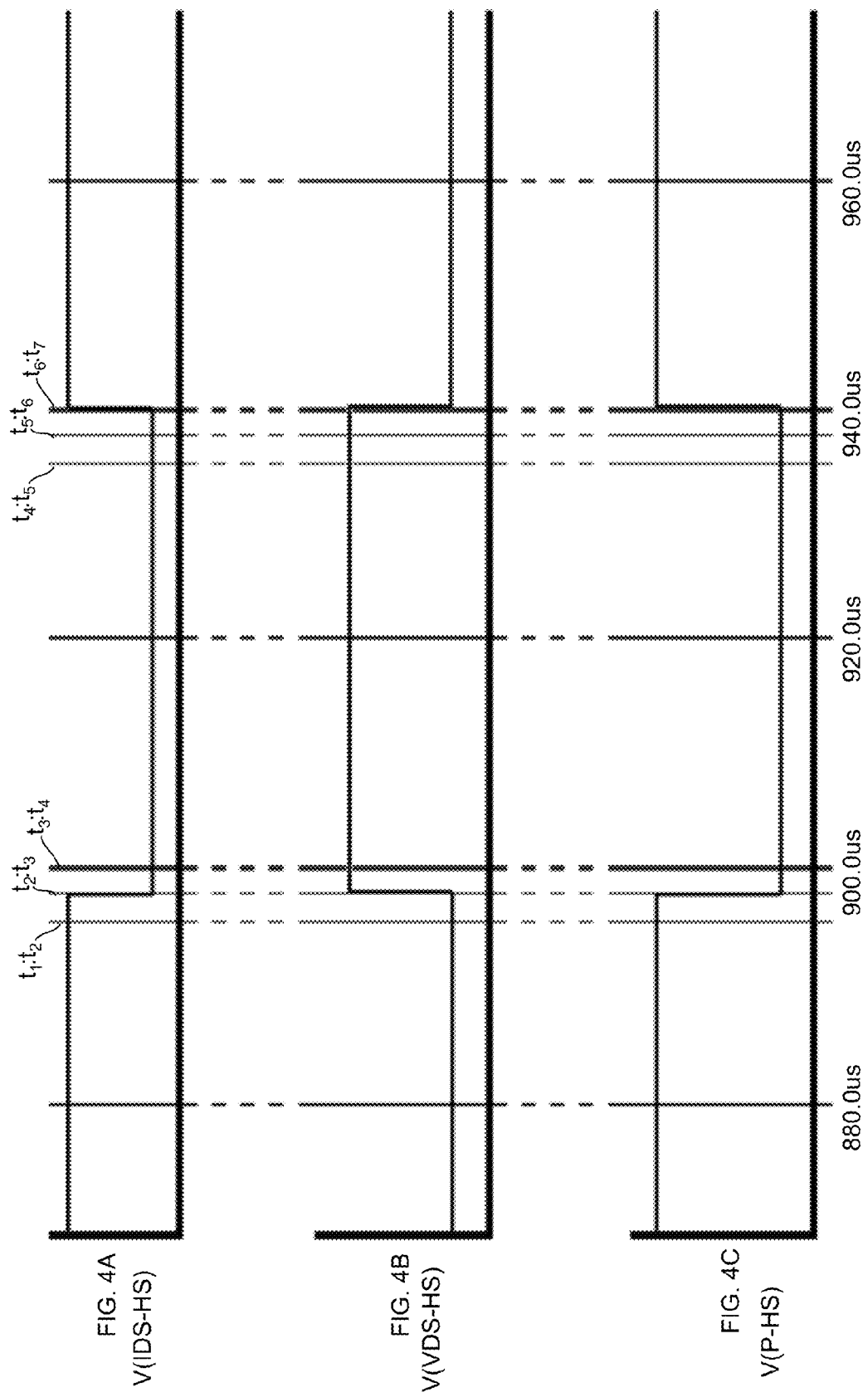

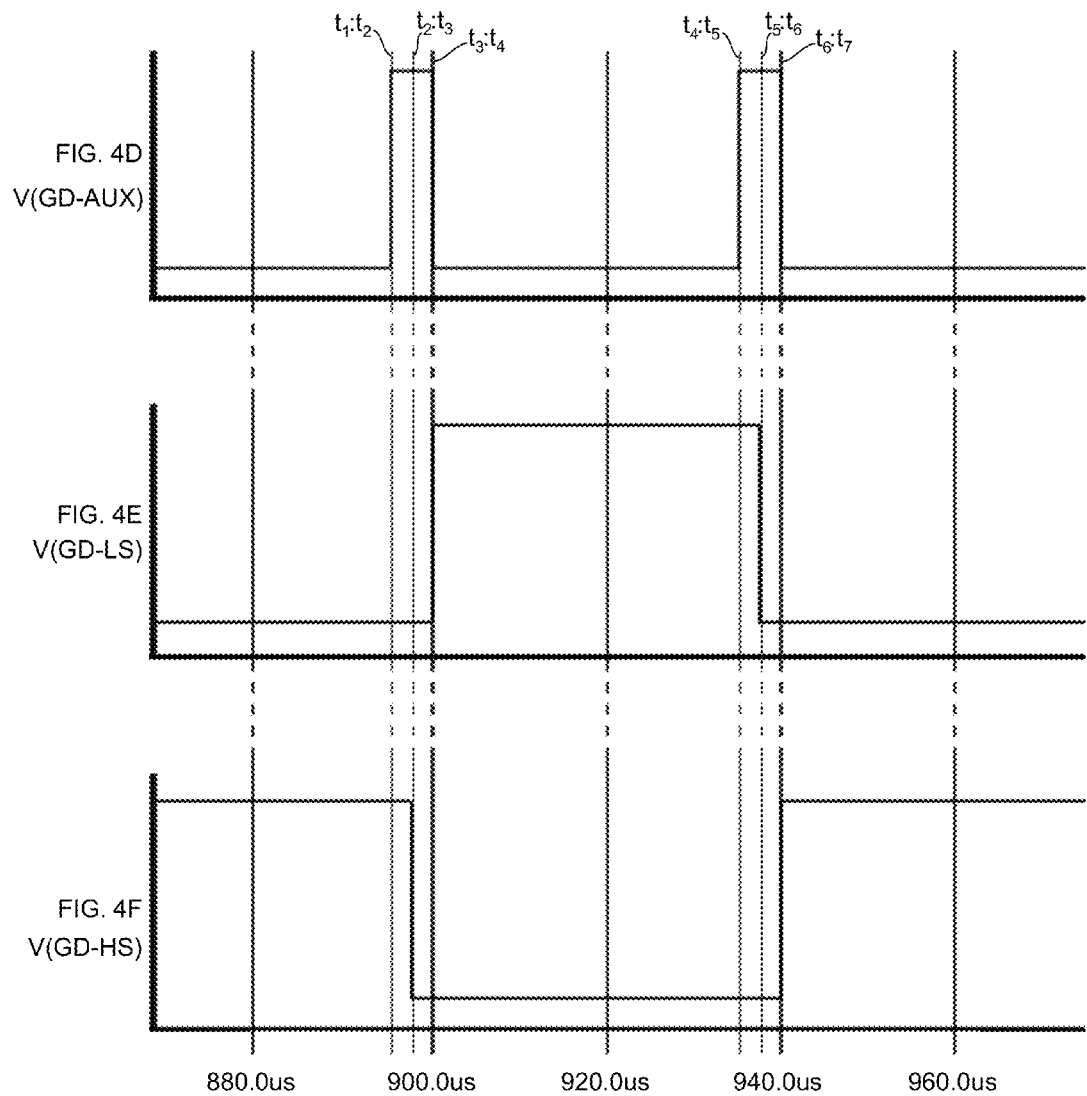

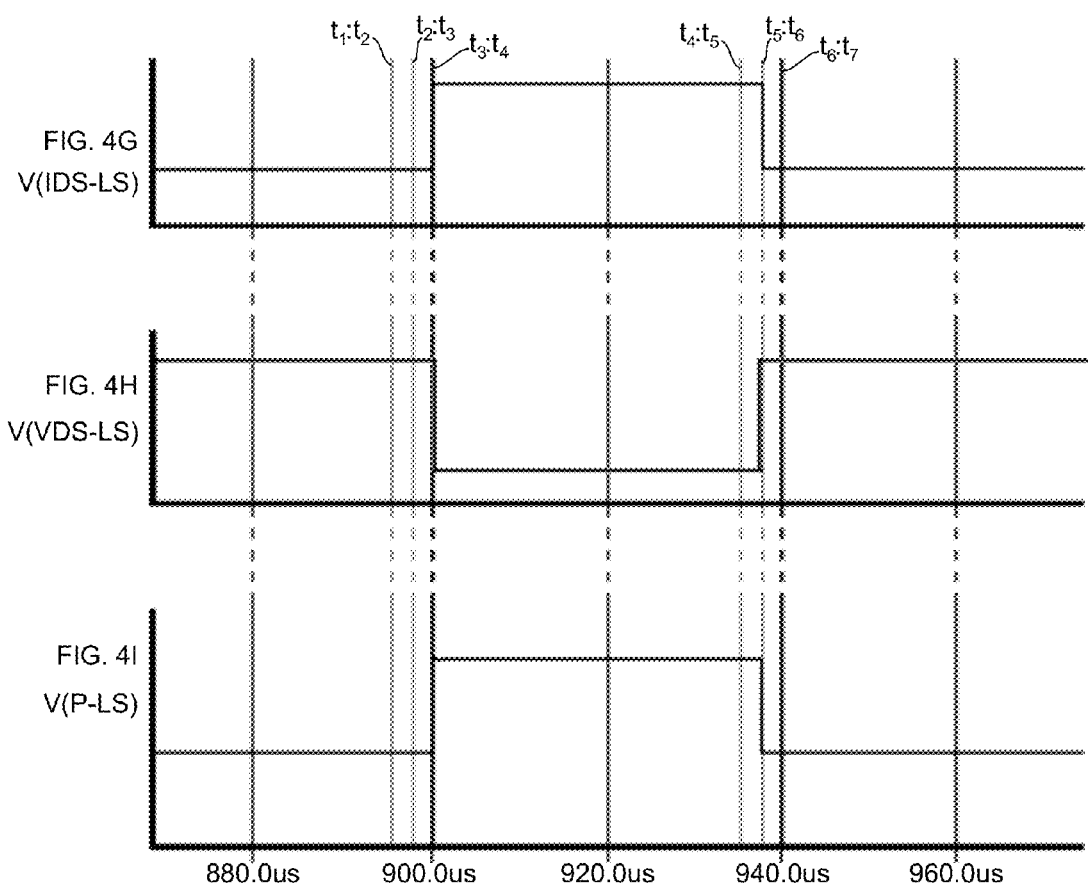

APPARATUS AND METHOD FOR SOFT SWITCHING IN A MEDIUM VOLTAGE TO LOW VOLTAGE CONVERTER

FIELD OF THE INVENTION

An apparatus in the form of a switching circuit and a control arrangement for the same provide the ability to effect soft switching in an arrangement that provides a conversion of a medium voltage to a low voltage.

BACKGROUND OF THE INVENTION

It is advantageous in an AC power transmission system to provide for the transmission at high voltages on the order of 1 kVRMS to 35 kVRMS. For ultimate use by the end user or power consumer these high voltages must be subjected to a down conversion such that a much lower AC voltage is supplied.

In various known arrangements the high voltages are first converted to medium voltages in the range of 1 kVRMS to 35 kVRMS. These medium voltages are then subjected to a conversion process utilizing an arrangement such as that shown in the block diagram of FIG. 1. In such an arrangement the medium AC voltage is converted to a medium DC voltage such as by a rectifier 110. The medium DC voltage, MV DC, is then stepped down to a low DC voltage, LV DC, in a circuit that includes a DC to AC inverter 120, a transformer 130 and an AC to DC Converter 140. The result is a low voltage DC output that can then be used as the input to a module that can comprise, for example, a 3-phase DC to AC converter.

While various arrangements have been proposed for such conversion circuits, each has had shortcomings, particularly as designers have struggled to implement a silicon-switch based solution where the switches that are turned ON and OFF to provide, for example, the conversion from DC to AC, are subjected to enormous stress by the switching transitions that occur at these medium voltages. It would therefore be useful to have a switching arrangement that includes semiconductor-based switching that has sufficient stability to enable soft switching of such switches thereby reducing the stress at the transition points in the conversion process at these medium voltages. Use of passive and active clamping methods in the primary connected circuit for the purpose of limiting voltage excursions, corresponding losses, and device voltage stress typically has yielded a larger number of components with high stress and lower systemic reliability. It would be useful to provide a circuit arrangement that performs voltage clamping on the primary side with higher systemic reliability.

In accordance with an aspect of the present invention a primary to secondary transformer constructed with small leakage inductance allows that various clamping methods may be available on the secondary which are effective in then acting as voltage clamps to the primary circuit and components. Such a method and circuit arrangement described herein effectively performs voltage clamping to the primary side by use of low voltage components on the secondary. The result is higher systemic reliability.

BRIEF DESCRIPTION OF THE DRAWINGS

FIGS. 4A to 4I illustrate timing diagrams for purposes of describing a possible operation of the exemplary arrangement of FIG. 3.

DETAILED DESCRIPTION

In accordance with one possible arrangement a hybrid transformer may be coupled between a medium voltage DC to AC inverter and a low voltage AC to DC Converter. The design of the transformer facilitates soft switching of switches in the medium voltage DC to AC inverter. More specifically the configuration of the transformer and the connection and operation of the transformer with a switching arrangement in the low voltage AC to DC Converter reduces the impact of the rapid turning on and turning off of the switches in the medium voltage DC to AC inverter. This makes it more feasible from a technical and cost perspective to use semiconductor-based switching in that inverter.

Figure 1:
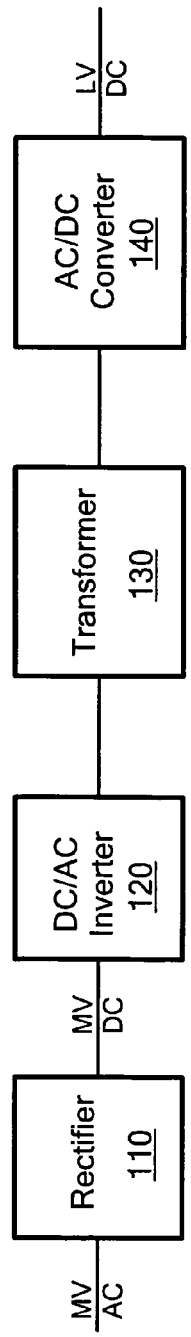
FIG. 1 is a block diagram of an example of an arrangement for converting medium voltage AC to low voltage DC.
Figure 2:
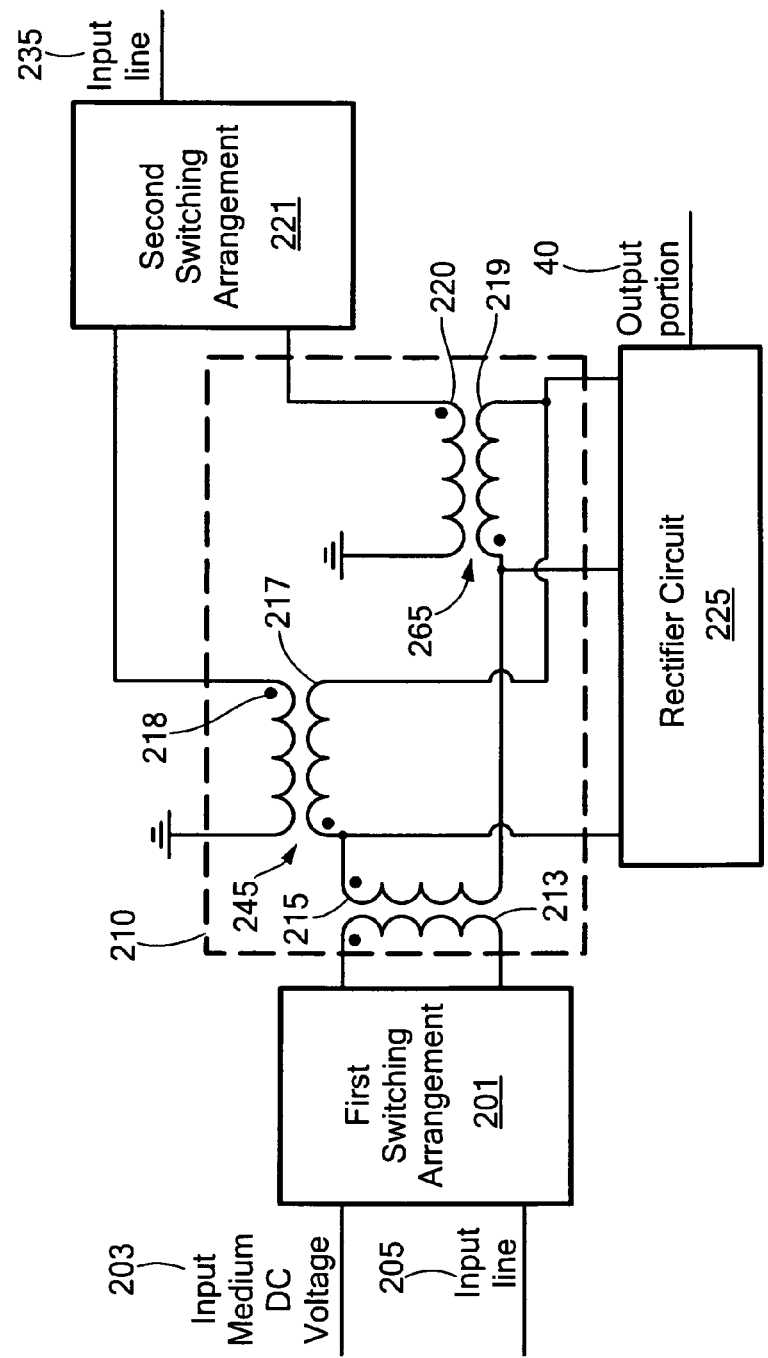
FIG. 2 is a block diagram of an embodiment of a medium voltage to low voltage converter in accordance with aspects of the invention.

In FIG. 2 an exemplary arrangement includes a first switching arrangement 201 that comprises a medium voltage DC to AC inverter. The switching arrangement is adapted to receive an input medium DC voltage such as at input 203 and one or more control signals that can be received on one or more input lines, one of which is shown as element 205. The first switching arrangement may include multiple semiconductor based switches. The switches are operated under the influence of the control signals such that they are turned ON and OFF with a timing to generate an AC voltage signal from the medium DC voltage, at a desired frequency. The first switching arrangement has an output portion that is shown coupled to a transformer arrangement 210. In this example the output of the first switching arrangement is coupled to a primary 213 of the transformer arrangement. The secondary side of the transformer arrangement is shown as having three portions. A first portion 215 is electromagnetically coupled to the primary of the transformer. A second portion 217 constitutes a primary side of a first secondary transformer 245. A third portion 219 constitutes a primary side of a second secondary transformer 265. A second switching arrangement 221 is coupled to the secondary sides 218 and 220 respectively of both of the secondary transformers 245 and 265. The second switching arrangement 221 can also receive one or more control signals on one or more input lines, one of which is shown as element 235. The secondary side of the transformer arrangement is coupled to a rectifier circuit 225 for converting the AC voltage to provide a low voltage DC output. An example of an output portion is shown at element 40.

In operation a controller portion, which is not shown but can be situated adjacent the first and second switching arrangements, can provide the control signals that are used by the first and second switching arrangements to effect the operation of such arrangements. In one example the control signals operate to control the turning ON and OFF of switches in the respective switching arrangements. The control signals provide such turning ON and turning OFF with a timing that takes advantage of the transformer arrangement so as to result in a soft switching of the multiple semiconductor-based switches in the first switching arrangement 201 that are operated to carry out the conversion of the medium voltage DC signal to a medium voltage AC signal. In particular a control signal causes the second switching arrangement to alternately allow and then block current through the secondary sides of the two secondary transformers, in FIG. 2 elements 245 and 265. As a result, while the secondary 218 of the first secondary transformer 245 is conducting current, the secondary 220 of the second secondary transformer 265 is blocked from conducting current. Conversely under control of a received control signal the second switching arrangement will block the secondary 218 of the first secondary transformer 245 when the secondary 220 of the second secondary transformer 265 is allowed to conduct current.

When a secondary side of a secondary transformer is blocked from conducting current, the primary side of that secondary transformer appears as an inductance reflecting back its current to the primary 213. This reflected current then has an impact in the first switching arrangement such that the current of one or more of the multiple switches for performing the DC to AC inversion is adjusted in advance of a change in the transition state of the one or more switches from either ON to OFF or from OFF to ON. The result is that the one or more switches are subjected to soft switching thereby avoiding or minimizing spike losses and effects that have had a negative impact on prior attempts to provide semiconductor-based switching for a medium voltage inverter arrangement.

More specifically, in the first switching arrangement there are two switching components that can each include one or more semiconductor-based switches. The one or more switches in a given switching component are responsive to the received control signals such that they are turned ON and OFF together. In one example of the invention the switches of a first switching component are responsive to the reflected current from the primary 217 of first secondary transformer 245 when the secondary 218 of the first secondary transformer is blocked from conducting current and therefore the switches of the first switching component are soft switched in their transition either from ON to OFF or from OFF to ON as they react to control signals. Further in accordance with this example, the switches of the second switching component are responsive to the reflected current from the primary 219 of the second secondary transformer 265 when the secondary 220 of the second secondary transformer is blocked from conducting current such that those switches are soft switched in their transition from either ON to OFF or OFF to ON as they react to control signals.

Thus in the arrangement proposed, control of a switching arrangement on the secondary side of the transformer, along with the arrangement of the transformer, can effect soft switching of switches on the DC to AC inverter side or primary connected circuit operating on medium voltages.

Figure 3:
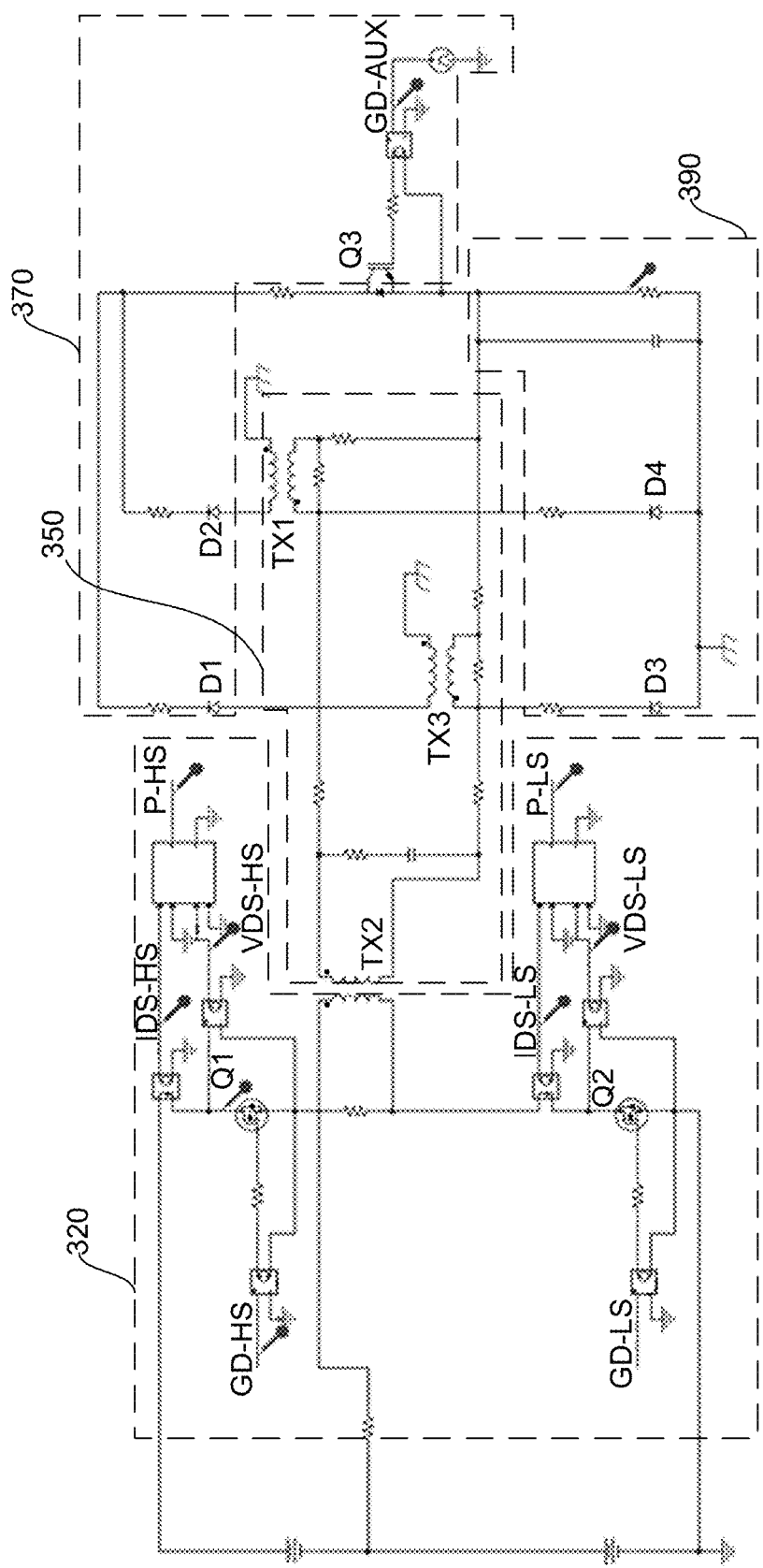
FIG. 3 illustrates one example of a switching arrangement that could used be in the embodiment of FIG. 2 with the exemplary switching arrangement shown in use in such that embodiment.

FIG. 3 illustrates one example of a switching arrangement that could be used with the exemplary switching arrangement shown in use in the embodiment of FIG. 2. In this example elements that might constitute one possible configuration for the first switching arrangement are shown in the dotted line box 320. Furthermore, elements that might constitute one possible configuration for the second switching arrangement are shown in the dotted line box 370. The transformer arrangement is shown in dotted line box 350. An example of a rectifier circuit arrangement is shown in box 390. It should be appreciated by one of skill in the art that the arrangement of FIG. 2 can actually be constituted by many different alternative switching structures and rectifier circuits and the invention is not limited to the specific switching arrangements and/or rectifier circuit presented as exemplary in FIG. 3.

In the exemplary embodiment of FIG. 3 the first switching arrangement 320 includes two semiconductor-based switches Q1 and Q2 which can be, for example IBJTs with Q1 being responsive to control signal GD HS and switch Q2 being responsive to control signal GD LS. The switches are coupled to the primary side of the transformer arrangement at TX2.

In the exemplary embodiment of FIG. 3 the second switching arrangement can include switch Q3 and switching diodes D1 and D2. Switch Q3, is a semiconductor-based switch is responsive to control signal GD AUX. The second switching arrangement is coupled to the secondaries of secondary transformers TX1 and TX3. In this arrangement, when the switch Q3 is in a first state under control of control signal GD AUX, D1 is in a state that permits the secondary of TX3 to conduct current while at the same time D2 is in a state that blocks conducting current in the secondary of secondary transformer TX1. When switch Q3 is in a second state under control of control signal GD AUX, D1 and D2 then block conducting current in the secondary of secondary transformer TX3 while allowing conduction of current in the secondary of secondary transformer TX1.

In this exemplary arrangement, when the current in the secondary of secondary transformer TX3 is blocked then the primary of secondary transformer TX3 represents an inductance that is reflected to the primary side of transformer TX 2 and acts to delay a current ramp in switch Q2 until after a voltage transition of that switch as controlled by control signal GD LS. Similarly, when the current in the secondary of secondary transformer TX1 is blocked, the primary of that secondary transformer TX 1 represents an inductance reflected to the primary of transformer TX2 that operates to control the current through switch Q1.

The arrangement and the timing of the control signals is such that the transformer components in the secondary of the hybrid transformer effects a soft switching of the switches in the medium voltage DC to AC inverter on the primary side of the hybrid transformer.

FIGS. 4A to 4I illustrate a plurality of timing diagrams for voltages at different points of the exemplary embodiment of FIG. 3 as the control signals operate to effect the ON and OFF transitions for the switches Q1, Q2, and Q3. The diagrams help to illustrate how the transitions are implemented as soft switching for switches Q1 and Q2.

FIG. 4A corresponds to a voltage detected at IDS-HS which tracks a current I1 through switch Q1.

FIG. 4B corresponds to a voltage detected at VDS-HS which tracks a voltage across switch Q1.

FIG. 4C corresponds to a voltage at P-HS which tracks a power across Q1.

FIG. 4D corresponds to a voltage at GD-AUX which is provided to control an ON-OFF state of switch Q3.

FIG. 4E corresponds to a voltage at GD-LS which is provided to control an ON-OFF state of switch Q2.

FIG. 4F corresponds to a voltage at GD-HS which is provided to control an ON-OFF state of switch Q1.

FIG. 4G corresponds to a voltage detected at IDS-LS which tracks a current I2 through switch Q2.

FIG. 4H corresponds to a voltage detected at VDS-LS which tracks a voltage across switch Q2.

FIG. 4I corresponds to a voltage at P-LS which tracks a power across Q2.

The following description provides an overview of the various states of the switches and the transition actions which occur at six different times through a given control cycle. It is simply representative of the timing that might be selected when implementing a control arrangement such as illustrated in FIG. 3 and is not meant to be limiting as to a particular timing arrangement.

When the circuits are in a first state S1 at a time prior to t1, switch Q3 is OFF as controlled by V(GD-AUX) of FIG. 4D being Low. Switch Q1 is ON with V(GD-HS) of FIG. 4E High, and switch Q2 is OFF with V(GD-LS) of FIG. 4F Low. In this state, voltage is applied across TX2 with a current ramp in primary and secondary of TX2. The TX2 primary current ramp being controlled by primary inductance of TX1/TX3.

At t1 there is a transition from state S1 to state S2. At time t1 switch Q3 is turned ON as V(GD-AUX) of FIG. 4D goes High, while Q1 remains ON and Q2 remains OFF. As a result, the primary current of secondary transformer TX3 is shunted to the secondary of the corresponding secondary transformer TX3 through D1 and Q3. Voltage on TX1 is clamped to C3 value and voltage is reflected to the primary of TX1 and thus to the secondary of primary transformer TX2. As a result, the primary voltage of TX2 is in turn clamped to C3 value by turns ratio of TX2, effectively clamping voltage across Q1. This is important in advance of the next transition time t2.

At transition t2, from state S2 to state S3, the voltage V(GD-HS), FIG. 4F, goes Low and turns OFF Q1. As can be seen in FIG. 4A, the current through Q1 drops to Low at this time, but as shown in FIG. 4B, because of the clamping effect described above, the voltage V(VDS-HS) does not immediately go High. The voltage that tracks the power across Q1, V(P-HS) of FIG. 4C goes Low at this time as a consequence of the various switch transitions. In this third state S3, then Q3 is ON, Q1 is OFF and Q2 is also OFF, with the soft switching of Q1 being effected by the clamping of the voltages of Q1 and Q2 during the turn OFF of switch Q1, reducing resonant loss in the Q1 and Q2 diodes.

At t3, a transition from state S3 to state S4, V(GD-AUX) of FIG. 4D goes Low turning OFF Q3 and V(GD-LS) of FIG. 4E goes High to turn ON Q2. Turning off Q3 places TX3 back into effective series inductance with TX2. Q2 is turned ON with effective series inductance of TX3 reflected to TX2 primary. As a result a current ramp of Q2 is limited during turn ON providing a soft turn-on of Q2.

At t4, a transition from state S4 to S5, V(GD-AUX) goes High again, thereby turning ON Q3 while Q1 remains OFF and Q2 remains ON.

At t5, a transition from state S5 to state S6, V(GD-LS) goes Low to turn OFF switch Q2. As a result the voltage V(IDS-LS) that tracks the current through switch Q2 goes to a Low state. As a result of this transition primary current of secondary transformer TX3 is shunted to the secondary of that transformer TX3 through D1 and Q3. Voltage on TX1 is clamped to C3 value and this voltage is reflected to the primary of TX2. The primary of TX2 voltage is in turn clamped to C3 value by turns ratio of TX2, effectively clamping voltage across Q2. The voltage of Q2 is effectively clamped during turn off of Q2 with the result being that there is a soft turn-off for Q2. This is consistent with the voltage transition across Q1 and Q2 as shown in FIGS. 4B and 4H respectively.

At t6, a transition from state S6 to state S7, V(GD-AUX) goes Low to turn OFF switch Q3 and also V(GD-HS) goes High to turn ON switch Q1. As a result of the changes in the control signals at this transition time, Q3 being turned OFF places TX3 back into effective series inductance with TX2. Q1 is turned ON with effective series inductance of TX3 reflected to TX1 primary. This limits current ramp of Q1 during turn on so that there is a soft turn-on of Q1.

Further indication of the impact on losses of this soft switching arrangement as indicated by the voltage signals that track the power across the switches on the primary medium voltage side of the circuitry, is shown in FIG. 4C (for Q1) and FIG. 4I (for Q2).

In FIG. 4C the voltage V(P-HS) that tracks the power across Q1 drops as the switch is turned OFF at transition t2, while the voltage across that switch is clamped due to the responsiveness of the circuitry on the secondary side. Similarly that voltage again transitions at transition t6 when switch Q1 is turned ON at that time, because the voltage V(VDS-HS) was clamped starting at transition t5.

In FIG. 4I the voltage V(P-LS) that tracks the power across Q2 goes from Low to High at transition t3 when switch Q2 is turned ON, but the voltage V(VDS-LS) was clamped already by the transition at t2 due to the responsiveness of the circuitry on the secondary side. Similarly that voltage V(P-LS) goes from High to Low at transition time t5 when the switch Q2 is turned OFF while the voltage V(VDS-LS) across the switch Q2 was clamped at transition t5.

As a result of the arrangement of the circuitry on the secondary side of the transformer, and the timing of the switching control on that circuitry in relation to the switching ON and OFF of the switches on the primary side, soft switching of those switches on the primary side is effected. The method described herein effectively performs voltage clamping to the primary side by use of low voltage components on the secondary. The result is higher systemic reliability.

What is claimed:

1. A medium voltage to low voltage DC to DC converter, comprising:
   a DC to AC voltage inverter;
   an AC to DC voltage converter; and
   a hybrid transformer coupled between the DC to AC voltage inverter and the AC to DC voltage converter, the hybrid transformer including a first transformer having a primary coupled to the DC to AC voltage inverter and a second transformer and a third transformer each having a primary coupled to a secondary of the first transformer and each having a secondary; and
   a second switching arrangement associated with the AC to DC converter and coupled to the second transformer and the third transformer wherein the second switching arrangement alternately blocks current in the secondary of the second transformer and the secondary of the third transformer to provide soft switching of one or more switches in the DC to AC voltage inverter,
   wherein when the second switching arrangement blocks current in the secondary of the third transformer the secondary of the second transformer is conducting current and the primary of the third transformer appears as an inductance reflecting back a current to the primary of the first transformer, and
   wherein when the second switching arrangement blocks current in the secondary of the second transformer the secondary of the third transformer is conducting current and the primary of the second transformer appears as an inductance reflecting back a current to the primary of the first transformer.

2. The DC to DC voltage converter of claim 1 further comprising a medium voltage switching circuit having switching states responsive to a state of the current in the secondary of the second transformer and the current in the secondary in the third transformer.

3. The DC to DC voltage converter of claim 2 further comprising:
   a central controller capable of sequencing the timing of states of the switching arrangement and the timing of inputs to the medium voltage switching arrangement.

4. A method for soft switching for a medium voltage to low voltage DC to DC converter, the method comprising:
   providing a DC to AC voltage inverter;
   providing an AC to DC voltage converter;
   providing a hybrid transformer coupled between the DC to AC voltage inverter and the AC to DC voltage converter, the hybrid transformer including a first transformer having a primary coupled to the DC to AC voltage inverter and a second transformer and a third transformer each having a primary coupled to a secondary of the first transformer and each having a secondary; and alternatingly blocking current in the secondary of the second transformer and the secondary of the third transformer to provide soft switching of one of more switches in the DC to AC voltage inverter, wherein when alternatingly blocking current in the secondary of the third transformer the secondary of the second transformer is conducting current and the primary of the third transformer appears as an inductance reflecting back a current to the primary of the first transformer, and wherein when alternatingly blocking current in the secondary of the second transformer the secondary of the third transformer is conducting current and the primary of the second transformer appears as an inductance reflecting back a current to the primary of the first transformer.

* * * * *